United States Patent
Soenkens et al.

(10) Patent No.: US 10,701,101 B2
(45) Date of Patent: Jun. 30, 2020

(54) METHOD AND DEVICE FOR AVERTING A MANIPULATION ON A CAN BUS USING A NODE CONNECTED TO THE BUS BY A CAN CONTROLLER

(71) Applicant: Robert Bosch GmbH, Stuttgart (DE)

(72) Inventors: Andreas Soenkens, Remseck am Neckar (DE); Arthur Mutter, Neuhausen (DE); Florian Hartwich, Reutlingen (DE); Thomas Keller, Rottweil (DE); Timo Lothspeich, Weissach (DE)

(73) Assignee: Robert Bosch GmbH, Stuttgart (DE)

( * ) Notice: Subject to any disclaimer, the term of this patent is extended or adjusted under 35 U.S.C. 154(b) by 70 days.

(21) Appl. No.: 15/767,935

(22) PCT Filed: Oct. 10, 2016

(86) PCT No.: PCT/EP2016/074214
§ 371 (c)(1),
(2) Date: Apr. 12, 2018

(87) PCT Pub. No.: WO2017/064001
PCT Pub. Date: Apr. 20, 2017

(65) Prior Publication Data
US 2018/0302431 A1    Oct. 18, 2018

(30) Foreign Application Priority Data

Oct. 15, 2015  (DE) .................. 10 2015 219 996

(51) Int. Cl.
*G06F 21/85*    (2013.01)
*H04L 29/06*    (2006.01)
*H04L 12/40*    (2006.01)

(52) U.S. Cl.
CPC .... *H04L 63/1441* (2013.01); *H04L 12/40026* (2013.01); *H04L 12/40104* (2013.01); *H04L 2012/40215* (2013.01)

(58) Field of Classification Search
CPC ...................................................... G06F 21/554
See application file for complete search history.

(56) References Cited

U.S. PATENT DOCUMENTS

| 8,799,520 B2 | 8/2014 | Schelkle et al. |
| 2008/0186870 A1* | 8/2008 | Butts .................. H04L 41/0659 370/252 |

(Continued)

OTHER PUBLICATIONS

Muter et al, "Entropy-Based Anomaly Detection for In-Vehicle Networks" 2011 IEEE Intelligent Vehicles Symposium (IV) Baden-Baden, Germany, Jun. 5-9, 2011.

(Continued)

*Primary Examiner* — Josnel Jeudy
(74) *Attorney, Agent, or Firm* — Norton Rose Fulbright US LLP; Gerard Messina

(57) ABSTRACT

A method for averting a manipulation on a CAN bus using a first node connected to the bus by a CAN controller includes a secured transmit module of the first node monitoring the bus; the transmit module recognizing transmission processes of the CAN controller in a normal operation of the first node; the transmit module recognizing a message transmitted impermissibly on the bus in a manner deviating from the normal operation; and, in the event the transmit module recognizes the message, the transmit module initiating countermeasures provided against the manipulation.

9 Claims, 3 Drawing Sheets

(56) References Cited

U.S. PATENT DOCUMENTS

| | | | |
|---|---|---|---|
| 2010/0250053 A1* | 9/2010 | Grill | G07C 5/085 |
| | | | 701/31.4 |
| 2014/0247122 A1* | 9/2014 | Moeller | B60R 25/10 |
| | | | 340/426.25 |
| 2015/0195297 A1* | 7/2015 | Ben Noon | H04L 63/1441 |
| | | | 726/22 |

OTHER PUBLICATIONS

International Search Report dated Nov. 29, 2016 of the corresponding International Application PCT/EP2016/074214 filed Oct. 10, 2016.
Tsutomu Matsumoto et al: "A Method of Preventing Unauthorized Data Transmission in Controller Area Network", 2012 IEEE 75th Vehicular Technology Conference (VTC Spring 2012) : Yokohama, Japan, May 6-9, 2012, IEEE, Piscataway, NJ, May 6, 2012 (May 6, 2012), pp. 1-5.

* cited by examiner

METHOD AND DEVICE FOR AVERTING A MANIPULATION ON A CAN BUS USING A NODE CONNECTED TO THE BUS BY A CAN CONTROLLER

CROSS-REFERENCE TO RELATED APPLICATIONS

The present application is the national stage of International Pat. App. No. PCT/EP2016/074214 filed Oct. 10, 2016, and claims priority under 35 U.S.C. § 119 to DE 10 2015 219 996.7, filed in the Federal Republic of Germany on Oct. 15, 2015, the content of each of which are incorporated herein by reference in their entireties.

FIELD OF THE INVENTION

The present invention relates to a method for averting a manipulation on a CAN bus using a node connected to the bus by a CAN controller. The present invention also relates to a corresponding device, a corresponding computer program, as well as a corresponding storage medium.

BACKGROUND

According to the related art, a CAN communication network is made up of at least two nodes that are able to exchange messages via the CAN connection according to the CAN specification. Accordingly, each bus node is able to send and receive messages. In order to avoid communication problems, at the time the network is designed, unique object identifiers (ID) are assigned to the respective bus nodes. On the receiver side, the CAN hardware checks whether the transmitted messages comply with the CAN specification, and in the case of transmission errors, can discard the message. The substantive check of a valid message falls within the responsibility of the application software.

U.S. Pat. No. 8,799,520 describes a method for operating a bus system, particularly a CAN bus. A plurality of stations are connectable to the bus system. A transmitted message has an identifier, only a single station ever being allowed to use a specific identifier. Each of the stations compares the identifier of a transmitted message to the identifiers it itself uses. In the event of a match, an error message is generated.

SUMMARY

The present invention provides a method for averting a manipulation on a CAN bus using a first node connected to the bus by a CAN controller, a corresponding device, a corresponding computer program, and a corresponding storage medium.

The method described is based on the knowledge that each bus node uses only the assigned object identifiers, and therefore messages received can be assigned unambiguously to the sender based on the object identifiers.

In the example of FIG. 1, bus node A was assigned the messages having identifiers 10 and 11, node B those with identifiers 20 and 21 and node C those with identifiers 30 and 31. If node B correctly receives message 11, node B assumes that message 11 is being sent by node A.

Consequently, a receiver on the bus is not able to determine which node actually sent the message. An attacker is able to compromise a bus node in such a way that it is able to transmit messages of other nodes on the bus, and consequently to impair the communication or the functioning of one or more bus nodes. In FIG. 2, bus node C has been compromised and is now also transmitting message 11 of node A. Node B cannot readily recognize that message 11 was sent by node C instead of node A. Since the CAN bus is a communications channel shared among all communication nodes, assuming a physical access to the communications channel, analogous attacks owing to integration of additional communication nodes are conceivable.

One benefit of the proposed method lies in the fact that the transmitters of messages monitor the communication on the bus, and in response to a recognized error, e.g., another bus node is just now transmitting an object identifier of the monitored transmitter, possibly with the aid of a secured transmit module, the corresponding message is able to be made invalid.

The method described can also be used to monitor certain CAN-network specifications, e.g., message frequencies and message time intervals of other bus nodes as well, so as to, in response to anomalies, possibly with corresponding error reactions, transfer the communication network into a safe state.

This procedure, especially in conjunction with a hardware security module (HSM), can also be used for monitoring the node's own transmit messages of the normal application software (ASW) with standard CAN nodes.

An advantage of this method lies further in the fact that the transmit module can be initialized (e.g., by the HSM) with the CAN object identifiers to be monitored. According to an example embodiment, the transmit module triggers a predefined error reaction in response to a recognized "illegal" message. Due to the additional transmit module, no changes of standard-compliant CAN modules, as marketed, for instance, by Robert Bosch GmbH under the trade name "M_CAN," are needed.

In an example embodiment, an error frame is generated on the bus while the illegal message is being transmitted. This does not conform to the CAN protocol specification, but is compatible with the CAN protocol. It corresponds to the reaction to a recognized transmission error. For example, the other message consumers can react with suitable alternate reactions to the messages failing to come.

Exemplary embodiments of the present invention are represented in the drawing and explained in greater detail in the following description.

DETAILED DESCRIPTION

According to an example embodiment, a method provides that bus nodes are equipped with a suitably secured hardware module (HW module), also referred to as a transmit module, capable of observing the bus communication. The transmit module can be linked to and managed by an HSM or other control unit. In normal operation, the module is initialized with the object identifiers that are to be transmitted by the bus node. In an alternative, the CAN-HW module can be developed so that it receives rules from a trustworthy control unit, e.g., the HSM, with regard to the bus node's own intended communication, for example, the periodicity of messages or maximum number of a certain message per unit of time.

The CAN-HW module recognizes the normal transmission processes of the standard CAN controller, and consequently, if necessary, is able to monitor the cyclical activity of the bus node. The transmission processes of its own bus node are recognized as valid and further measures are not necessary.

In the event that a bus node, e.g., a gateway, becomes compromised or assumes an error state so that the node transmits illegal messages that do not match with the messages configured in the HW module, or in the event it does not honor the defined communication rules for the messages to be transmitted by the bus node, this is able to be recognized by the HW module of the respective node, and, according to example embodiments of the present invention, at least one of the following countermeasures is responsively initiated: 1. during ongoing transmission of the illegal message, the transmit module generates an error frame and thereby makes the illegal message invalid; 2. the transmit module reports the illegal message to the message consumers via other communication channels, for example, other CAN messages; 3. the control unit (CU) generates a bus-off error state and transfers the remaining bus nodes into a safer state, e.g., a controlled emergency operation; and 4. for example, with the aid of a hardware intervention, the transmit module prevents further CAN messages from being able to be sent, e.g., by disconnecting the transmit line (Tx) between CAN controller and CAN transceiver.

Figure 1:
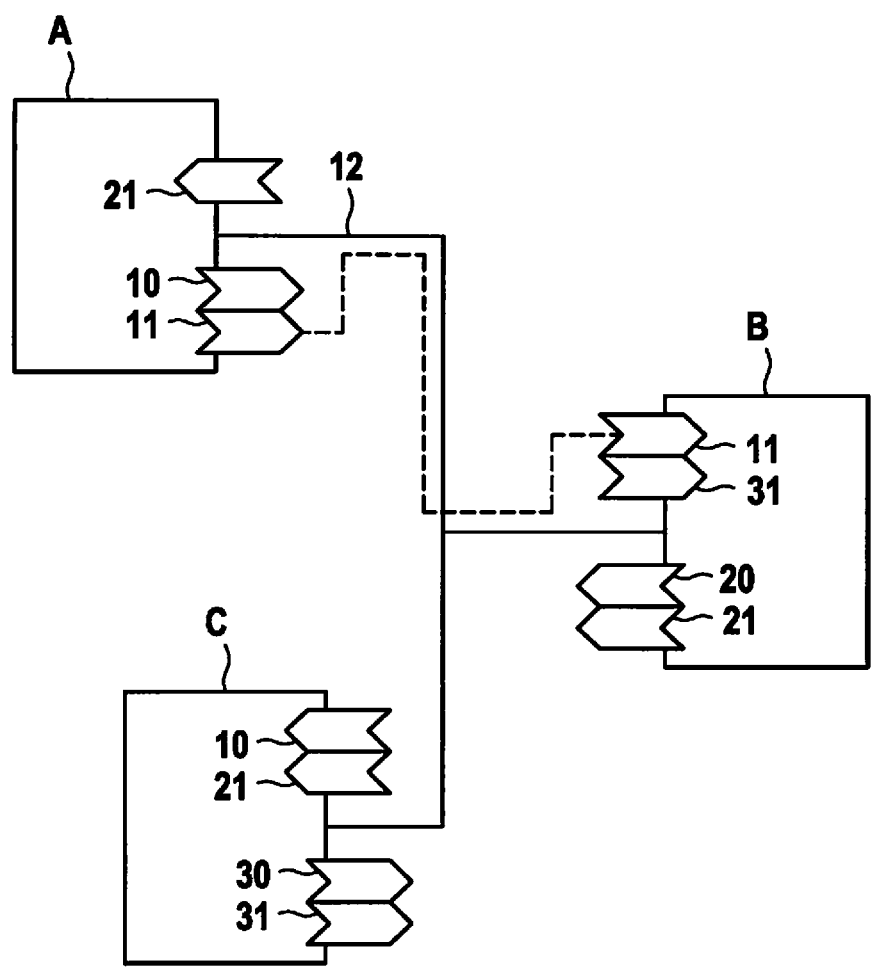
FIG. 1 is a block diagram of a normal transmission process.
Figure 2:
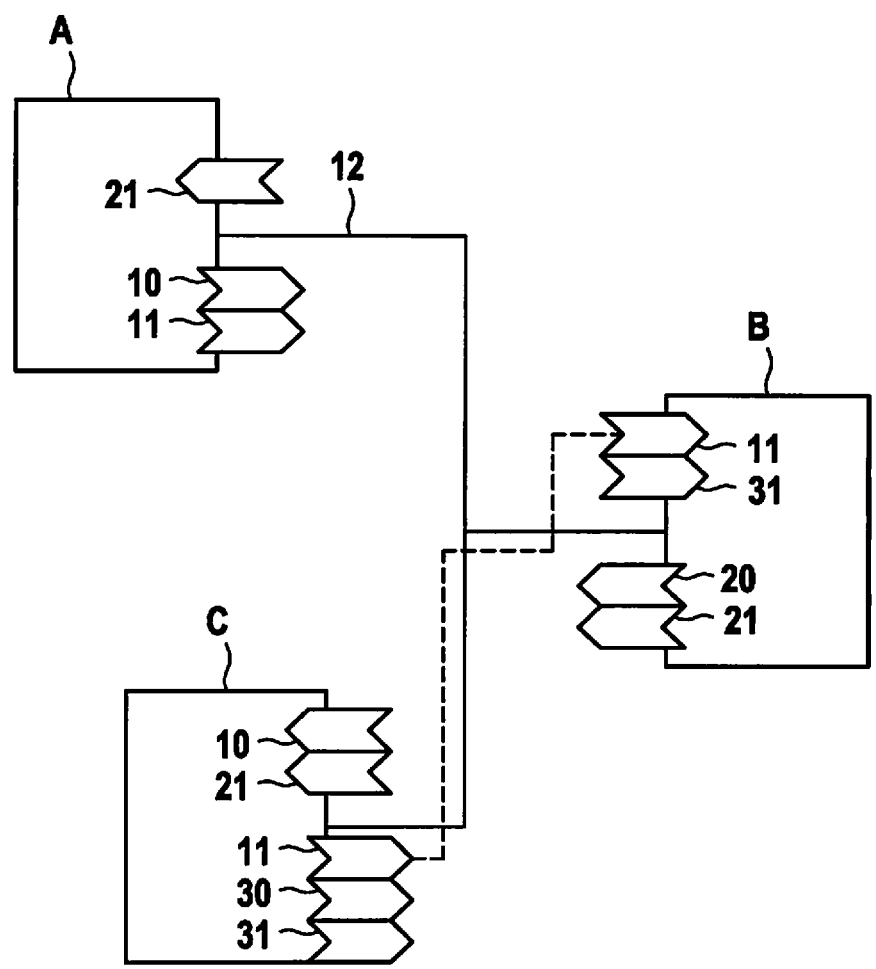
FIG. 2 is a block diagram of an illegal transmission process.
Figure 3:
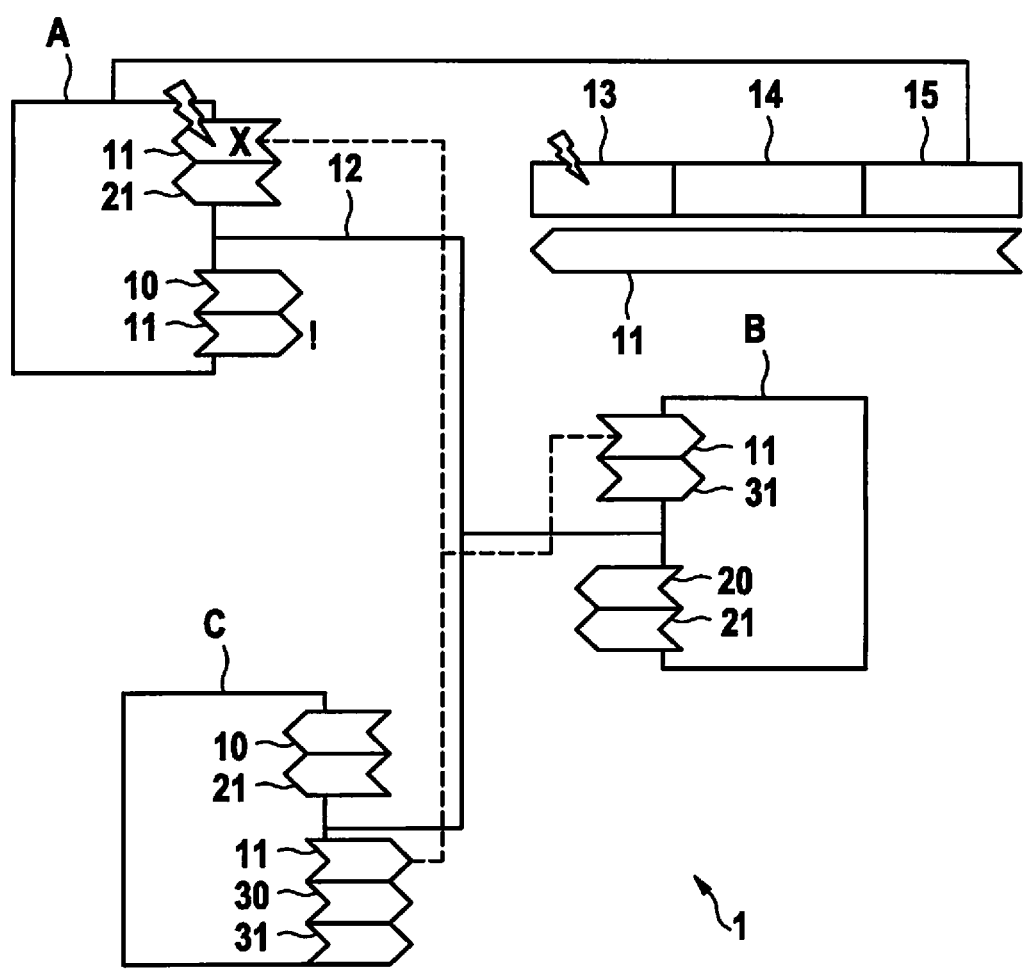
FIG. 3 illustrates a method for averting an illegal manipulation according to an example embodiment of the present invention.

In the event that a node, for example, a compromised node C or perhaps a node additionally integrated into the network, transmits messages, in the present case, message 11 made up of arbitration field 13, data 14, and end of frame (EOF) 15, which are actually assigned exclusively to another node (e.g., node A), they are able to be recognized by the original sender (node A) and suitable alternate or error reactions can be triggered (see FIG. 3), such as for example at least one of the following: 1. during ongoing transmission of the illegal message, the transmit module generates an error frame and thereby makes the illegal message invalid; 2. the transmit module reports the illegal message to the message consumers via other communication channels, for example, other CAN messages; and 3. the control unit (CU) generates a bus-off error state and transfers the remaining bus nodes into a safer state, e.g., a controlled emergency operation.

If the transmit module of a node A is designed to monitor communication rules (e.g., the periodicity of messages or maximum number of a certain message per unit of time) of other communication nodes, the transmit module of node A is then able to determine that another communication node (e.g., node B) is violating these rules and can trigger suitable alternate or error reactions, such as, for example, at least one of the following: 1. during ongoing transmission of the illegal message, the transmit module generates an error frame and thereby makes the illegal message invalid; 2. the transmit module reports the illegal message to the message consumers via other communication channels, for example, other CAN messages; and 3. the control unit (CU) generates a bus-off error state and transfers the remaining bus nodes into a safer state, e.g., a controlled emergency operation.

If a plurality of CAN modules (e.g., of the M_CAN type), but only one transmit module are integrated on a controller, the transmit module can be switched over cyclically by hardware multiplexer to one CAN module at a time, and the associated CAN bus may be scanned.

What is claimed is:

1. A method comprising:

monitoring a Controller Area Network (CAN) bus by a secured transmit module of a first node;

identifying, by the transmit module, transmission processes of a CAN controller, by which the first node is connected to the bus, in a normal operation of the first node;

receiving, by the CAN controller from a hardware security module, predefined rules of the transmission processes, wherein the received predefined rules of the transmission processes include a rule regarding a periodicity of messages or a rule regarding a maximum number of a certain message per unit time;

transmitting on the bus, by a second node connected to the bus, a first message;

identifying, by the transmit module, that the first message was or is being transmitted impermissibly on the bus in a manner deviating from the normal operation, wherein the transmit module identifies that the first message was or is being transmitted impermissibly on the bus using the received predefined rules; and responsive to the identifying of the first message transmitted impermissibly, initiating, by the transmit module, countermeasures against a manipulation by the transmitted first message.

2. The method of claim 1, wherein the countermeasures include generation of an error frame on the bus while the first message is being transmitted.

3. The method of claim 1, wherein the countermeasures include reporting of the first message via a communication channel.

4. The method of claim 1, wherein the countermeasures include transfer of the bus into an error state.

5. The method of claim 1, wherein:

in the normal operation, the transmit module is initialized with permissible object identifiers of the first node;

the first node transmits a second message on the bus;

the transmit module identifies that the second message was or is being transmitted impermissibly on the bus based on the object identifiers; and responsive to the identifying of the first message transmitted impermissibly, preventing further transmission processes by a hardware intervention in the CAN controller.

6. The method of claim 1, further comprising:

in the normal operation, initializing the transmit module with permissible object identifiers of the first node;

a second node connected to the bus transmitting a second message on the bus, wherein the transmit module identifies that the second message was transmitted impermissible on the bus using the received pre-define rules; and responsive to the identifying of the second message transmitted impermissibly, initiating, by the transmit module, countermeasures against a manipulation by the transmitted second message.

7. A non-transitory computer-readable medium on which are stored instructions that are executable by a processor of a node connected to a Controller Area Network (CAN) bus by a CAN controller and that, when executed by the processor, cause the processor to perform a method, the method comprising:

monitoring the CAN bus by a secured transmit module of the node;

identifying, by the transmit module, transmission processes of a CAN controller, by which the first node is connected to the bus, in a normal operation of the first node;

receiving, by the CAN controller from a hardware security module, predefined rules of the transmission processes, wherein the received predefined rules of the transmission processes include a rule regarding a periodicity of messages or a rule regarding a maximum number of a certain message per unit time;

transmitting on the bus, by a second node connected to the bus, a first message;

identifying, by the transmit module, that the first message was or is being transmitted impermissibly on the bus in a manner deviating from the normal operation, wherein the transmit module identifies that the first message was or is being transmitted impermissibly on the bus using the received predefined rules; and responsive to the identifying of the first message transmitted impermissibly, initiating, by the transmit module, countermeasures against a manipulation by the transmitted first message.

8. The method as recited in claim 1, further comprising:
determining, using the received predefine rules, by the transmit module, that the second node violated the rule regarding the periodicity of messages or the rule regarding the maximum number of the certain message per unit time; and responsive to the determining, the transmit module initiating the countermeasures.

9. The non-transitory computer-readable medium of claim 7, wherein the method further comprises:
determining, using the received predefine rules, by the transmit module, that the second node violated the rule regarding the periodicity of messages or the rule regarding the maximum number of the certain message per unit time; and responsive to the determining, the transmit module initiating the countermeasures.

* * * * *